(12) United States Patent
Lee

(10) Patent No.: US 8,810,958 B2
(45) Date of Patent: Aug. 19, 2014

(54) BASE PLATE HAVING FILTER FIXING PROTRUSION FOR HARD DISK DRIVE AND HARD DISK DRIVE INCLUDING THE SAME

(71) Applicant: Samsung Electro-Mechanics Co., Ltd., Suwon (KR)

(72) Inventor: Hyun Chul Lee, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/711,965

(22) Filed: Dec. 12, 2012

(65) Prior Publication Data

US 2013/0148239 A1 Jun. 13, 2013

(30) Foreign Application Priority Data

Dec. 13, 2011 (KR) .................. 10-2011-0133468

(51) Int. Cl.
*G11B 33/14* (2006.01)

(52) U.S. Cl.
USPC .................. 360/97.17; 360/99.16

(58) Field of Classification Search
CPC ............ G06F 1/1658; B22F 2003/245; G11B 33/123
USPC ............. 360/99.15, 99.16, 99.2, 97.16, 97.17
See application file for complete search history.

(56) References Cited

U.S. PATENT DOCUMENTS

| | | | | |
|---|---|---|---|---|
| 5,034,837 A | * | 7/1991 | Schmitz | 360/256.2 |
| 5,500,028 A | * | 3/1996 | Iizuka | 55/385.1 |
| 5,751,514 A | * | 5/1998 | Hyde et al. | 360/97.21 |
| 5,910,862 A | * | 6/1999 | Ogawa et al. | 360/97.16 |
| 6,008,965 A | * | 12/1999 | Izumi et al. | 360/97.16 |
| 6,296,691 B1 | * | 10/2001 | Gidumal | 96/17 |
| 6,389,869 B1 | * | 5/2002 | Wakita et al. | 72/379.2 |
| 7,146,713 B1 | * | 12/2006 | Ying | 29/603.16 |
| 7,274,532 B2 | * | 9/2007 | Hwang | 360/99.16 |
| 7,274,534 B1 | * | 9/2007 | Choy et al. | 360/97.18 |
| 7,570,460 B2 | * | 8/2009 | Kitahori et al. | 360/265.6 |
| 7,733,600 B2 | * | 6/2010 | Endo et al. | 360/99.15 |
| 7,849,578 B2 | * | 12/2010 | Ying | 29/430 |
| 2004/0006954 A1 | | 1/2004 | Yoo | |
| 2006/0126217 A1 | * | 6/2006 | Shin et al. | 360/97.01 |
| 2006/0221493 A1 | * | 10/2006 | Chee et al. | 360/97.01 |
| 2007/0263351 A1 | * | 11/2007 | Ho et al. | 361/685 |
| 2012/0075745 A1 | * | 3/2012 | Davis et al. | 360/97.02 |
| 2012/0275053 A1 | * | 11/2012 | McGuire, Jr. | 360/97.16 |

FOREIGN PATENT DOCUMENTS

JP 2001-325777 11/2001
KR 10-2004-0007820 1/2004

* cited by examiner

*Primary Examiner* — Brian Miller

(57) ABSTRACT

A base plate for a hard disk drive including a disk accommodating part on which a disk having data stored therein is disposed; a head seating part formed to be lower than a position of the disk accommodating part and including a head driver disposed thereon providing driving force to a read-write head reading the data stored on the disk and writing data thereto; a filter seated on the disk accommodating part and collecting foreign objects from air flowing during rotation of the disk; and a filter fixing protrusion formed by exerting pressure on a bottom surface of the disk accommodating part in a predetermined position to allow the predetermined position to protrude, and fixing the filter.

3 Claims, 5 Drawing Sheets

BASE PLATE HAVING FILTER FIXING PROTRUSION FOR HARD DISK DRIVE AND HARD DISK DRIVE INCLUDING THE SAME

CROSS-REFERENCE TO RELATED APPLICATIONS

This application claims the priority of Korean Patent Application No. 10-2011-0133468 filed on Dec. 13, 2011, in the Korean Intellectual Property Office, the disclosure of which is incorporated herein by reference.

BACKGROUND OF THE INVENTION

1. Field of the Invention

The present invention relates to a base plate for a hard disk drive and a hard disk drive including the same, and more particularly, to a base plate for a hard disk drive having an improved filter assembly structure so that the structure may be applied to a base plate manufactured in a pressing process or a forging method, and a hard disk drive including the same.

2. Description of the Related Art

In general, a hard disk drive (HDD), a computer information storage device, reads data stored on a disk or writes data to the disk by using a read-write head.

In a hard disk drive, a base plate is commonly provided with a head driver, that is, ahead stack assembly (HSA), capable of moving the read-write head across the disk. The read-write head performs its function while moving to a desired position in a state in which it is suspended at a predetermined height above a writing surface of the disk by the head driver.

According to the related art, in manufacturing the base plate provided in the hard disk drive, a post-processing scheme of die-casting aluminum (Al) and then removing burrs or the like generated due to the die-casting, has been used.

However, in the die-casting scheme according to the related art, since a process of injecting aluminum (Al) for forging in a molten state to form a form is performed, high temperatures and high pressures are required, such that a large amount of energy is required in the process and processing time may be increased.

Further, in terms of a lifespan of a die-casting mold, there is a limitation in manufacturing a large number of base plates using a single mold, and a base plate manufactured by the die-casting process may have poor dimensional precision.

Therefore, in order to solve defects in the die-casting process, the base has been manufactured using a pressing process or forging method. However, in the case of manufacturing the base plate using a press processing or forging method, the base plate can be provided with a uniform thickness, such that a precise shape thereof may be difficult to implement.

Particularly, in the hard disk drive, foreign objects present in air flowing during rotation of the disk are collected by a filter, such that the inflow of foreign objects such as fine particles into a read-write head is prevented. Here, since the filter has a relatively thin shape, a structure for fixing the filter to the base plate is required.

However, in the case of using a pressing process or forging method, it may be difficult to implement a structure for fixing the filter, such that reliability of the hard disk drive may be deteriorated.

Therefore, research into technology for improving a filter assembly structure so as to firmly fix the filter, even in the case of using a press processing or forging method, has been urgently demanded.

SUMMARY OF THE INVENTION

An aspect of the present invention provides a base plate for a hard disk drive capable of firmly fixing a filter even in the case of using a pressing process or forging method, and a hard disk drive including the same.

According to an aspect of the present invention, there is provided a base plate for a hard disk drive, including: a disk accommodating part on which a disk having data stored therein is disposed; a head seating part formed to be lower than a position of the disk accommodating part and including a head driver disposed thereon providing driving force to a read-write head reading the data stored on the disk and writing data thereto; a filter seated on the disk accommodating part and collecting foreign objects from air flowing during rotation of the disk; and a filter fixing part formed by punching a portion of the disk accommodating part and vertically raising the portion of the disk accommodating part, and fixing the filter.

The disk accommodating part may include a seating groove formed in a predetermined position thereof, on which the filter is fixedly seated.

The base plate for a hard disk drive may further include a side wall part formed outside of the disk accommodating part to enclose an outer peripheral surface of the disk.

The side wall part may include a groove formed therein, and one side of the filter may be seated in the groove.

The base plate for a hard disk drive may further include a sealing member sealing a punched portion of the disk accommodating part.

According to another aspect of the present invention, there is provided a base plate for a hard disk drive, including: a disk accommodating part on which a disk having data stored therein is disposed; a head seating part formed to be lower than a position of the disk accommodating part and including a head driver disposed thereon providing driving force to a read-write head reading the data stored on the disk and writing data thereto; a filter seated on the disk accommodating part and collecting foreign objects from air flowing during rotation of the disk; and a filter fixing protrusion formed by exerting pressure on a bottom surface of the disk accommodating part in a predetermined position to allow the predetermined position to protrude, and fixing the filter.

The base plate for a hard disk drive may further include a side wall part formed outside of the disk accommodating part to enclose an outer peripheral surface of the disk.

The side wall part may include a groove formed therein, and one side of the filter may be seated in the groove.

According to another aspect of the present invention, there is provided a hard disk drive, including: the base plate for a hard disk drive as described above; a spindle motor coupled to the base plate for a hard disk drive to rotate a disk; a read-write head reading data from and writing data to the disk; and a head driver moving the read-write head to a predetermined position on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
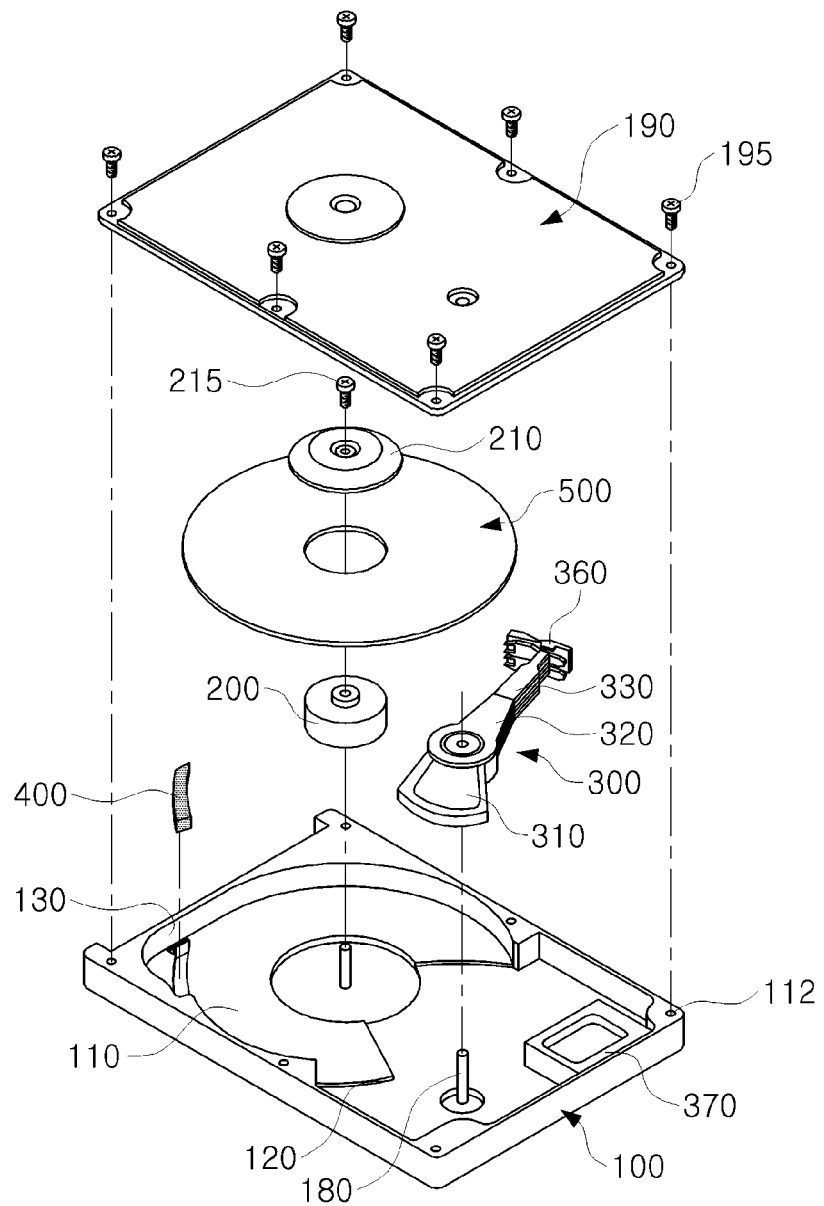
FIG. 1 is a schematic exploded perspective view showing a hard disk drive according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements maybe exaggerated for clarity, and the same reference numerals will be used throughout to designate the same or like elements.

FIG. 1 is a schematic exploded perspective view showing a hard disk drive according to an embodiment of the present invention.

Referring to FIG. 1, the hard disk drive according to the embodiment of the present invention may include a base plate 100 for a hard disk drive (hereinafter, referred to as a base plate), a spindle motor 200, a head driver 300, and a filter 400.

The base plate 100 may be a housing forming an outer casing together with a cover plate 190 in the hard disk drive according to the embodiment of the present invention and may include a disk accommodating part 110, a head seating part 120, a side wall part 130, and a filter fixing part 140.

Here, the base plate 100 and the cover plate 190 may be coupled to each other using a plurality of screws 195 to be inserted into holes 112 formed in the base plate 100.

The disk accommodating part 110, a part on which a disk 500 coupled to a spindle motor 200 to be described below is disposed, may have the disk 500 positioned thereon, wherein the disk 500 has data stored thereon.

In the disk accommodating part 110, the filter fixing part 140 or a filter fixing protrusion 170 may formed so that a filter 400 to be described below is fixed, and a seating groove 150 on which the filter 400 is seated may be formed. A description thereof will be provided below through various embodiments.

The disk accommodating part 110 may be formed to have a generally circular shape so as to correspond to a shape of the disk 500, and a portion of the disk accommodating part 110 may be stepped to configure the head seating part 120 on which a head driver 300 to be described below is disposed.

Here, the reason for which the head seating part 120 is positioned to be lower than the disk accommodating part 110 is to provide a space in which the head driver 300 may be repeatedly rotated so as to allow data to be read from and written to the disk 500.

That is, the reason is to secure a space in which the head driver 300 provides driving force to a read-write head (not shown) to insert the read-write head (not shown) into the disk 500, thereby reading data from and writing data to the disk 500.

The side wall part 130 may be formed outside of the disk accommodating part 110 so as to enclose an outer peripheral surface of the disk 500.

A groove 160 may be formed in the side wall part 130 in a predetermined position therein, so that one side of a filter 400 to be described below may be seated therein.

The spindle motor 200, provided to rotate the disk 500, may be fixedly installed in the center of the disk accommodating part 110. The disk 500, coupled to the spindle motor 200 to rotate together therewith, may have a writing surface on which data can be written.

Here, the spindle motor 200 may include a clamp 210 coupled to an upper end portion thereof by a screw 215 in order to firmly fix the disk 500 thereto.

In addition, although FIGS. 1 and 2 show a configuration in which a single disk is mounted on the spindle motor 200, this configuration is only an example. That is, one or more disks 500 may be mounted on the spindle motor 200. In the case in which a plurality of disks 500 are mounted thereon, a circular ring-shaped spacer for maintaining an interval between the disks 500 may be disposed therebetween.

The head driver 300 may be known as a head stack assembly (HAS) and may be a component having a read-write head (not shown) mounted thereon and moving the read-write head (not shown) to a predetermined position to write data to the disk 500 or read data from the disk 500.

The head driver 300 may include a voice coil motor (VCM), a swing arm 320, and a suspension 330, wherein the suspension 330 may be fixedly coupled to a front end portion of the swing arm 320.

In addition, the head driver 300 may be coupled to the base plate 100 so as to be rotatable around a pivot axis 180 of the head seating part 120 of the base plate 100. When the disk 500 rotates on the disk accommodating part 110 of the base plate 100 at a relatively high speed, the read-write head (not shown) may serve to read the data from the writing surface of the disk 500 or write data to the writing surface of the disk 500.

Here, the VCM, a component providing rotational driving force to the head driver 300, may include magnets (not shown) disposed in upper and lower sides of a VCM coil 310 of the head driver 300.

The VCM may be controlled by a servo control system and may rotate the head driver 300 around the pivot axis 180 according to Fleming's left hand rule by interaction between current input by the VCM coil 310 and a magnetic field formed by the magnets (not shown).

Here, when an operation start command is input to the hard disk drive according to the embodiment of the present invention, the disk 500 starts to rotate, and the VCM rotates the swing arm 320 in a counterclockwise direction to move the read-write head (not shown) onto the writing surface of the disk 500.

On the other hand, when an operation stop command is input to the hard disk drive according to the embodiment of the present invention, the VCM rotates the swing arm 320 in a clockwise direction to allow the read-write head (not shown) to deviate from the disk 500.

The read-write head (not shown) deviating from the writing surface of the disk 500 may be parked in a ramp 360 provided outside the disk 500.

In addition, a corner portion of one side of the base plate 100 may be provided with a flexible printed board (FPC) bracket 370 in order to connect a flexible printed circuit (FPC) board (not shown) connected to the head driver 300 to a main circuit board (not shown) disposed under the base plate 100.

The filter 400 may be a component seated on the disk accommodating part 110, collecting foreign objects from air flowing during rotation of the disk 500, and preventing inflow of the foreign objects into the read-write head (not shown) to thereby improve reliability of the hard disk drive.

During a hard disk assembly process, foreign objects such as fine particles may remain in the hard disk drive, and when external impact is applied or the disk 500 starts to rotate or stops, foreign objects may be generated by friction of a surface of the disk 500.

As described above, when the foreign objects remain in the hard disk drive, in the case in which the foreign objects on the surface of the disk 500 and the read-write head (not shown) collide with each other during rotation of the disk 500, the read-write head (not shown) and the surface of the disk 500 may be damaged. Therefore, data writing and reading performance or reliability of the read-write head (not shown) may be deteriorated.

Due to the above-mention reason, the filter 400 capable of collecting the foreign objects on the hard disk drive may be provided. This filter 400 may have a structure such as a sponge so as to collect the foreign material and allow air to pass therethrough.

The filter may be fixed to the base plate 100 by the filter fixing part 140 or the filter fixing protrusion 170 provided in the base plate 100, which will be described below with reference to FIGS. 2A through 4.

Figure 2A:
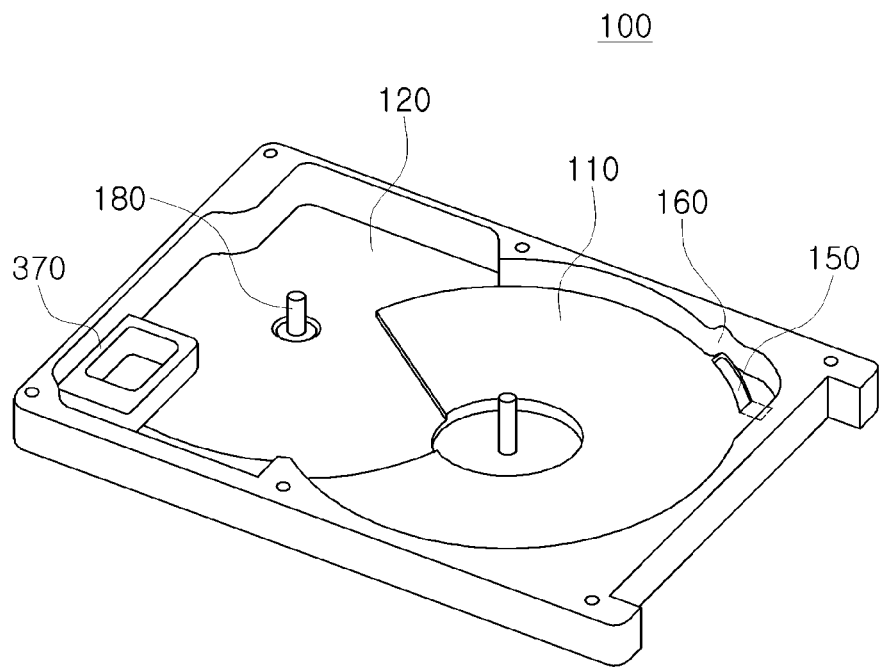
FIGS. 2A through 2C are schematic perspective views of a base plate provided in the hard disk drive according to the embodiment of the present invention.
Figure 2B:
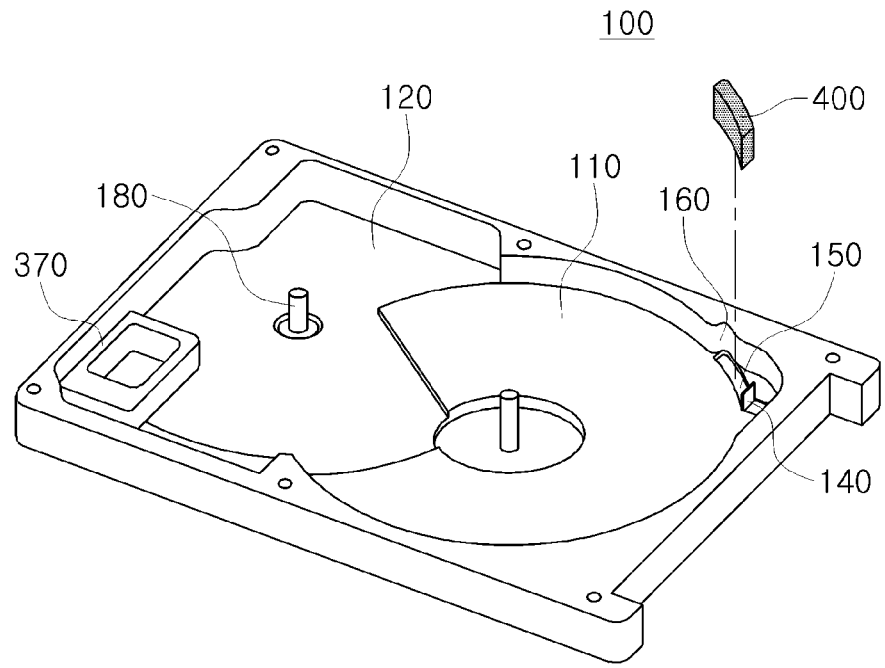
Figure 2C:
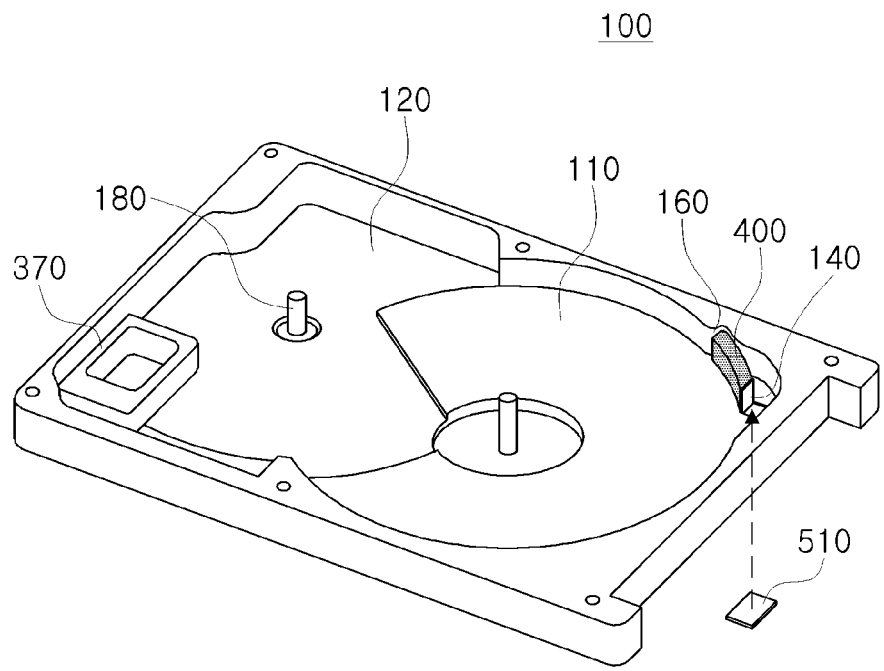

FIGS. 2A through 2C are schematic perspective views of a base plate provided in the hard disk drive according to the embodiment of the present invention.

Referring to FIG. 2A, in a base plate 100 for a hard disk drive provided in the hard disk drive according to the embodiment of the present invention, a basic configuration may be formed by performing a pressing process or forging process on a plate, that is, a cold rolled steel sheet (SPCC, SPCE, or the like). Then, the entire shape may be completed by performing a post process such as a bending process, a cutting process, and the like.

That is, a primary base plate 100 including a disk accommodating part 110, a head seating part 120 disposed to be lower than a position of the disk accommodating part 110, and a side wall part 130 formed outside of the disk accommodating part to enclose most of the outer peripheral surface of the disk 500 may be manufactured.

Here, the pressing process or forging process according to the embodiment of the present invention in order to prevent defects such as large energy consumption and a long processing time in the existing die-casting process may be significantly effective in consideration of process efficiency, but there is a limitation in implementing a separate structure for fixing the above-mentioned filter 400 due to characteristics of the pressing process or forging process.

Therefore, the filter fixing part 140 is formed by punching a portion of the disk accommodating part 110 corresponding to a position at which the filter fixing part 140 will be formed and then vertically raising the portion of the disk accommodating part, such that the filter 400 may be fixed thereto.

The filter fixing part 140 may be formed by cutting another portion using a punch, or the like, except for the portion of the disk accommodating part bent upwardly and folded.

In addition, the filter fixing part 140 may have the same size and radius of curvature as the side wall part 130 in consideration of the height and the radius of curvature of the side wall part 130 in the case in which the filter fixing part 140 is folded and vertically raised.

Referring to FIG. 2B, after the primary base plate 100 is formed, a portion of the disk accommodating part 110 is punched and vertically raised to form the filter fixing part 140, such that a secondary base plate 100 including the filter fixing part may be manufactured.

In the case in which the base plate 100 is manufactured using the pressing process or forging method, it may be difficult to implement a separate configuration for fixing the filter 400, but the portion of the disk accommodating part 110 is punched and vertically raised to form the filter fixing part 140, such that the filter fixing part 140 may be used for firmly fixing the filter 400.

In addition, in order to improve pulling out force of the filter 400, the seating groove 150 may be formed by the pressing process at a predetermined position of the disk accommodating part 110 on which the filter 400 is seated, and the filter 400 may be more firmly fixed by applying an adhesive to the seating groove 150.

Further, the groove 160 may be formed in the side wall part 130 so that one side of the filter 400 is seated and supported.

That is, one side of the filter 400 is seated in the groove 160 formed in the side wall part 130 and supported by the groove 160, and the other side thereof is supported by the filter fixing part 140, such that the filter 400 may be firmly fixed to the base plate 100.

Referring to FIG. 2C, the portion of the disk accommodating part 110 is punched and then vertically raised to form the filter fixing part 140, such that a hole having a size corresponding to the filter fixing part 140 may be formed in the disk accommodating part 110.

Since the hole needs to be sealed in order to improve performance of the hard disk drive according to the embodiment of the present invention, the hole may be sealed by a sealing member 510.

That is, the sealing member 510 covering the hole may be coupled to the bottom surface of the base plate 100, and a member such as tape, or the like, may be used therefor.

Therefore, the hole is sealed using the sealing member 510, such that the base plate 100 is completed. As a result, the base plate 100 using the pressing process and forging method, including the filter fixing part 140, and having reliability may be completed.

Figure 3A:
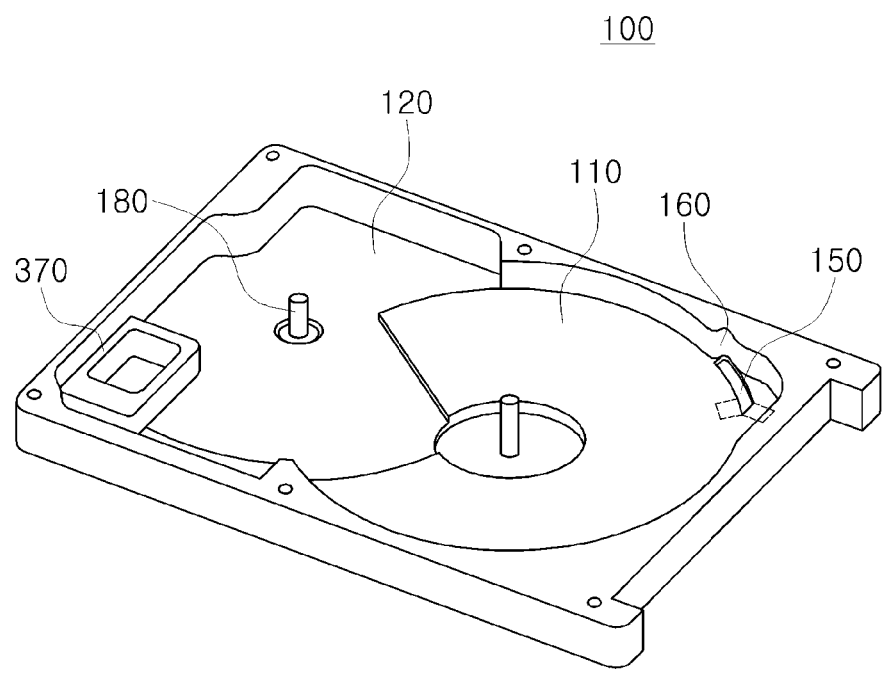
FIGS. 3A through 3C are schematic perspective views of a base plate provided in a hard disk drive according to another embodiment of the present invention.
Figure 3B:
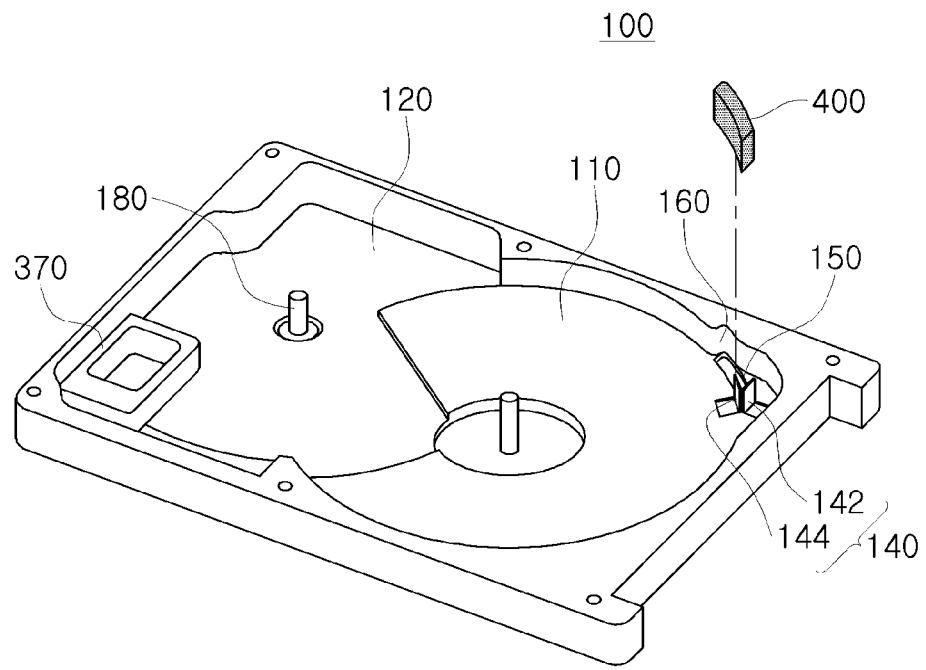
Figure 3C:
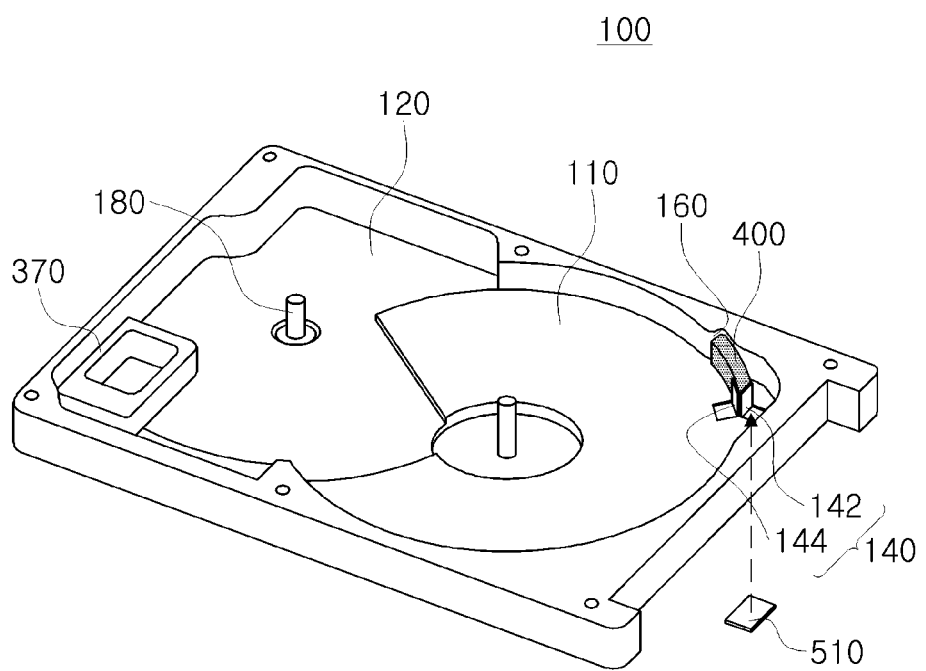

FIGS. 3A through 3C are schematic perspective views of a base plate provided in a hard disk drive according to another embodiment of the present invention.

Since a base plate 100 provided in the hard disk drive according to another embodiment of the present invention is the same as the base plate provided in the hard disk drive according to the embodiment of the present invention described with reference to FIGS. 1 through 2C except that a filter fixing part 140 is configured of a first filter fixing part 142 and a second filter fixing part 144, a description of other components except for the filter fixing part 140 will be omitted.

Referring to FIGS. 3A through 3C, the base plate 100 provided in the hard disk drive according to another embodiment of the present invention may include the first and second filter fixing parts 142 and 144.

The first and second filter fixing parts 142 and 144 maybe formed by punching portions of a disk accommodating part 110 corresponding to positions at which the first and second filter fixing parts 142 and 144 will be formed and then vertically raising the portions of the disk accommodating part.

Further, the first and second filter fixing parts 142 and 144 may also be formed by cutting other portions of the disk accommodating part by using a puncher, or the like, except for the portions of the disk accommodating part bent upwardly and folded. In addition, the first and second filter fixing parts 142 and 144 may have the same size and radius of curvature as those of the side wall part 130 in consideration of the height and the radius of curvature of the side wall part 130 in the case in which the filter fixing parts 142 and 144 are folded and vertically raised.

One surface of a filter 400 collecting foreign objects from air flowing during rotation of a disk may be supported by the first filter fixing part 142, and the other surface thereof may be supported by the second filter fixing part 144.

That is, since at least two surfaces of the filter 400 may be supported by the first and second filter fixing parts 142 and 144, the filter 400 may be more firmly fixed to the base plate 100.

Figure 4A:
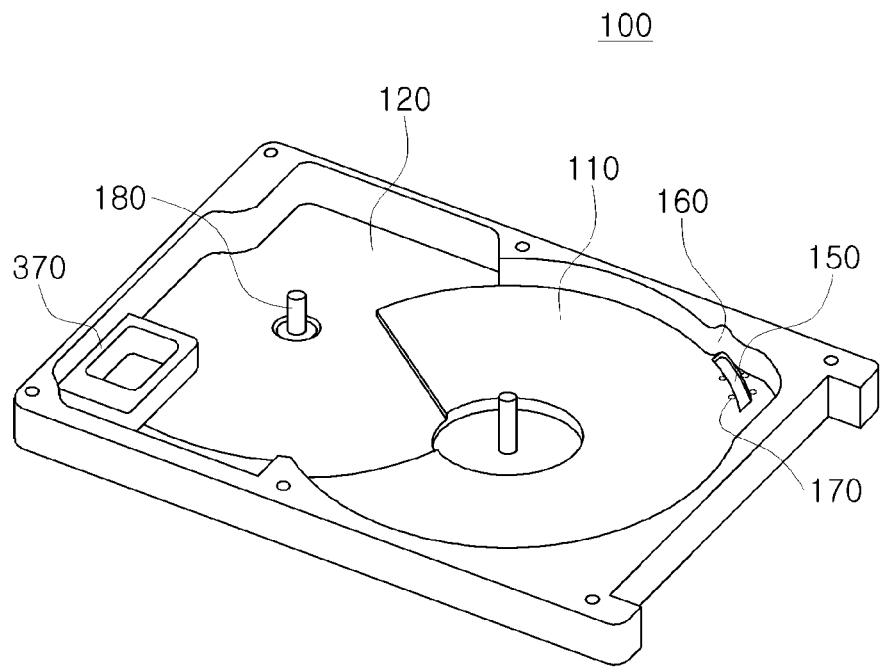
FIGS. 4A and 4B are schematic perspective views of a base plate provided in a hard disk drive according to another embodiment of the present invention.
Figure 4B:
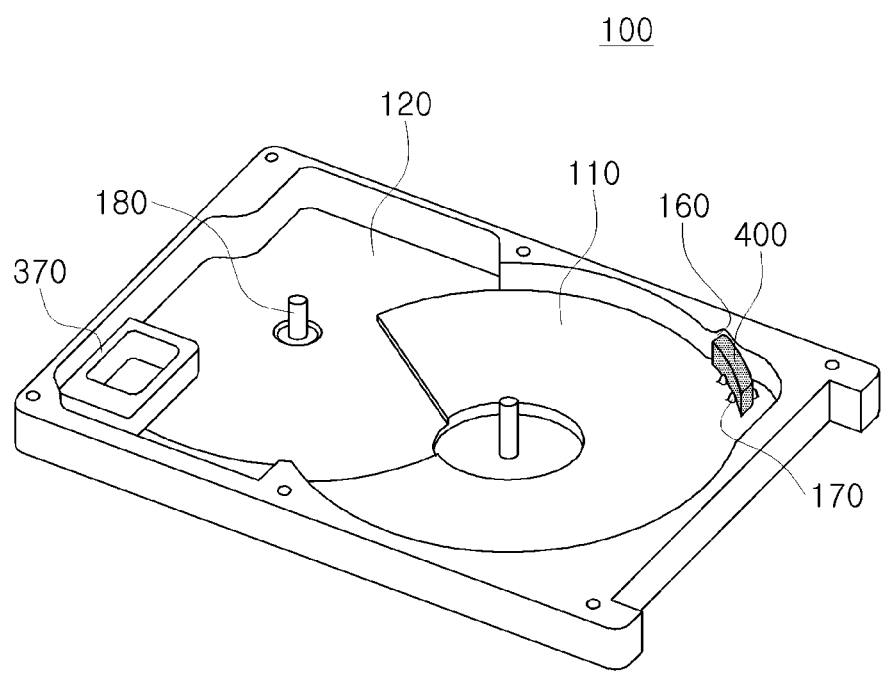

FIGS. 4A and 4B are schematic perspective views of a base plate provided in a hard disk drive according to another embodiment of the present invention.

Referring to FIGS. 4A and 4B, a base plate 100 provided in a hard disk drive according to another embodiment of the present invention may include a filter fixing protrusion 170 for supporting a filter 400.

Since the base plate 100 provided in the hard disk drive according to another embodiment of the present invention is the same as the base plate provided in the hard disk drive according to the embodiment of the present invention described with reference to FIGS. 1 through 2C except that the filter fixing protrusion 170 is formed instead of forming the filter fixing part 140 in order to fix the filter 400, a description of other components except for the filter fixing protrusion 170 will be omitted.

The filter fixing protrusion 170 may be formed by exerting pressure on a bottom surface of a disk accommodating part 110 in a predetermined position to allow the predetermined position to protrude and be formed in plural so as to firmly fix the filter 400 collecting foreign objects from air flowing during rotation of a disk 500.

In the plurality of filter fixing protrusions 170, a certain amount of protrusions may support one surface of the filter 400, and the other protrusions may support the other surface of the filter 400, such that the filter 400 may be fixed. In addition, a seating groove 150 is formed at a predetermined position of the disk accommodating part 110 on which the filter 400 is seated, and an adhesive is applied to the seating groove 150, such that the filter 400 may be more firmly fixed.

Further, one side of the filter 400 is supported by a groove 160 formed in a side wall part 130, such that the filter 400 may be firmly fixed to the base plate 100.

Through the above-mentioned embodiments, the base plate 100 for a hard disk drive may be manufactured using the pressing process or forging method, and the base plate 100 in which defects of the pressing process or forging method are solved may be manufactured by punching the portion of the disk accommodating part 110 and vertically raising the portion of the disk accommodating part 110 to form the filter fixing part 140 or by exerting pressure on the bottom surface of the disk accommodating part 110 in a predetermined position to form the filter fixing protrusion 170, in order to fix the filter 400 for collecting the foreign objects from air flowing during rotation of the disk 500.

Further, the base plate 100 may be manufactured by the pressing process or forging process to significantly reduce the processing time and the energy consumption, whereby the production capability may be significantly improved.

As set forth above, with the base plate for a hard disk drive and the hard disk drive including the same according to the embodiments of the present invention, the filter may be firmly fixed even in the case of using the pressing process or forging process, whereby reliability of the hard disk drive may be improved.

In addition, since the base plate for a hard disk drive may be manufactured by the forging or pressing process to significantly reduce a processing time and energy consumption, whereby the production capability may be improved.

While the present invention has been shown and described in connection with the embodiments, it will be apparent to those skilled in the art that modifications and variations can be made without departing from the spirit and scope of the invention as defined by the appended claims.

What is claimed is:

1. A base plate for a hard disk drive, comprising:
   a disk accommodating part including a disk disposed thereon having data stored therein;
   a head seating part formed to be lower than a position of the disk accommodating part and including a head driver disposed thereon providing driving force to a read-write head reading the data stored on the disk and writing data thereto;
   a filter seated on the disk accommodating part and collecting foreign objects from air flowing during rotation of the disk; and
   a filter fixing protrusion formed by exerting pressure on a bottom surface of the disk accommodating part in a predetermined position to allow the predetermined position to protrude, and fixing the filter.

2. The base plate for a hard disk drive of claim 1, further comprising a side wall part formed outside of the disk accommodating part to enclose an outer peripheral surface of the disk.

3. The base plate for a hard disk drive of claim 2, wherein the side wall part includes a groove formed therein, and one side of the filter is seated in the groove.

* * * * *